UNITED STATES PATENT OFFICE.

JOHN COPE BUTTERFIELD, OF LONDON, ENGLAND, ASSIGNOR TO EDWARD ALFRED PATERSON, OF PORT ARTHUR, ONTARIO, CANADA.

PROCESS FOR THE TREATMENT OF SEWAGE AND THE LIKE.

1,122,474.  Specification of Letters Patent.  Patented Dec. 29, 1914.

No Drawing.   Application filed March 24, 1913. Serial No. 756,383.

*To all whom it may concern:*

Be it known that I, JOHN COPE BUTTERFIELD, a subject of the King of Great Britain, residing at 5 Bloomfield Place, New Bond street, London, England, have invented a new and useful Improved Process for the Treatment of Sewage and the like, of which the following is a specification.

This invention relates to a process for the treatment of sewage and similar organic matter whereby the decomposing organic matter is rendered innocuous and the greater part of the consituents of the sewage or the like is recovered in commercially valuable forms.

According to this invention I spray the sewage sludge that comes from the filter presses or the other matter to be treated with a small quantity (say 0.5 to 4%) of petroleum or the like hydrocarbons, and I then subject the sludge or other matter to destructive distillation in retorts with exclusion of air at a low temperature (500° to 900° F.). A percentage of 50 to 75 of water in the press cakes is not deleterious, but they should be as dry as can conveniently be arranged. As the heat rises the chemical reactions set up inside the retort give rise to a distillate consisting of oils, fats and ammonia compounds which may be separated and treated by well known means and any non-condensable gas is brought back and burnt under the retort. By this distillation fatty acids are obtained and may be recovered as condensed products. By reason of the petroleum vapor the fatty acids which are present as calcic stearate, palmitate and oleate are preserved from destruction and are carried over into the ammoniacal liquor of the distillate, being partially saponified and converted into ammonia salts by the ammonia in the retort. From the ammoniacal liquor the fatty bodies are recovered by any known means. At the temperatures employed possibly some of the fatty matter is subjected to change, and probably some reactions between the steam from the contained water and the vapors from the petroleum, as well as some of the gases from the decomposing organic matter, form easily volatile or gaseous hydrocarbons which are subsequently carried back to be burnt under the still. The steam formed probably aids in breaking up the fats present into fatty acids and glyceryl. The acids may pass over largely unchanged at the temperatures here indicated. Any ammonia gas formed of course passes over too, and unites with the condensed fatty acids of the distillate to form soaps. Most of the fatty matter present has been changed into the calcic salts mentioned. The heat to which these salts are subjected is sufficient to break them up, and the fatty acids as such, pass over for the most part unchanged, partly because of the petroleum vapors and partly because of the water vapors—the cumulative pressure of both vapors at the temperatures indicated being considerable. Probably any uncombined fat under the conditions present unites with the steam and the petroleum to form volatile or gaseous hydrocarbons which are carried away to be burned under the still, the reaction being probably somewhat analogous to the natural formations of mineral hydrocarbons. When this first distillation is completed at the low temperature indicated, the matter in the retort is moved forward and dropped into another retort which is heated to a temperature of approximately 1000° to 1200° F. Any volatile matter not removed at the lower temperature is now carried off and all organic matter as such is completely destroyed. Any usuable vapors may, of course, be condensed or burned. Steam and air are blown into the retort, the steam is partially decomposed, its hydrogen combining with the nitrogen in the sewage matter to form ammonia while its oxygen combines with some of the carbon to form carbon monoxid which supplies the heat necessary for the reaction. After the completion of this second heating there is left in the retort a solid residue containing lime, silicious matters, animal charcoal, phosphoric acid, etc., these substances being either free or in combination, and this residue may be used for the precipitation of a fresh portion of raw sewage. By such repeated use the residue becomes rich in phosphoric acid and may be ultimately used as manure.

What I claim is:—

1. A process for the treatment of organic refuse yielding oils, fats and ammonia compounds, which consists in subjecting said refuse while in a dry condition to destructive distillation with exclusion of air at a temperature sufficient to liberate oils and to carry over into the distillate the fatty acids in a partially saponified condition in the form of ammonia salts.

2. A process for the treatment of organic refuse yielding oils, fats and ammonia compounds, which consists in adding to said refuse a small percentage of petroleum and subjecting said refuse while in a dry condition to destructive distillation with exclusion of air at a temperature sufficient to liberate oils and to carry over into the distillate the fatty acids in a partially saponified condition in the form of ammonia salts.

3. A process for the treatment of organic refuse yielding oils, fats and ammonia compounds, which consists in adding to said refuse a small percentage of petroleum and subjecting such refuse while in a dry condition to destructive distillation with exclusion of air at a temperature sufficient to liberate oils and to carry over into the distillate the fatty acids in a partially saponified condition in the form of ammonia salts, and then heating the residue of this treatment at a much higher temperature to drive off the remaining noxious gases and produce a residuum suitable for use as a precipitating agent and as a manure.

4. A process of treating organic refuse yielding oils, fats and ammonia compounds, which consists in adding a small per cent. of petroleum to it and in subjecting the refuse thus treated to destructive distillation with exclusion of air at a temperature sufficient to liberate oils and to carry over into the distillate the fatty acids in a partially saponified condition in the form of ammonia salts, then heating the residuum at a higher temperature to drive off the remaining noxious gases and to produce a residuum suitable for use as a precipitating agent and as a manure, steam being blown in during the treatment to supply hydrogen to combine with the nitrogen in the refuse to form ammonia, and oxygen to combine with the carbon present to form carbon monoxid.

5. A process for the treatment of organic refuse yielding oils, fats and ammonia compounds, which consists in subjecting said refuse while in a dry condition to destructive distillation with exclusion of air at a temperature of from 500° to 900° F. to liberate oils and to carry over into the distillate the fatty acids in a partially saponified condition in the form of ammonia salts, and subsequently heating the residuum at a temperature of from 1000° to 1200° F. to produce a residuum suitable for use as a precipitating agent and as a manure.

6. A process for the treatment of organic refuse which consists in adding to it petroleum, heating it with exclusion of air at a temperature of from 500° to 900° F., subsequently heating it at a temperature of from 1000° to 1200° F., and blowing in steam during the said subsequent heating.

7. A process for the treatment of organic refuse which consists in adding to it petroleum, distilling off with exclusion of air and at a temperature of from 500° to 900° F. gases, fats and oils, subsequently heating it at a temperature of from 1000° to 1200° F., and blowing in steam during such subsequent heating.

8. A process for treating refuse yielding oils, fats and ammonia compounds, which consists in treating said refuse with a small quantity (.5% to 4%) of petroleum, subjecting such refuse thus treated while in a dry condition to destructive distillation at a temperature of from 500° to 900° F. to liberate oils and to carry over into the distillate the fatty acids in a partially saponified condition in the form of ammonia salts, and in recovering from the distillate the oils, ammonia and fatty bodies contained therein.

9. A process for treating refuse to recover valuable constituents thereof which consists in charging said refuse with a hydrocarbon, subjecting the mass under pressure to a temperature between 500° F. and 900° F., collecting and condensing the vapors and recovering from the distillate fatty acids, subjecting the residuum to distillation at a higher temperature and repeatedly using the residuum from this second distillation as a precipitating agent in treating raw sewage until it becomes richly charged with phosphoric acid.

10. A process for treating refuse to recover its valuable constituents which consists in charging such refuse with a hydrocarbon, subjecting the charged mass to distillation at a comparatively high temperature, after the completion of this distillation, raising the temperature to 1000° F. or more, until volatile matter has been driven off and repeatedly using the residuum in the retort as a precipitant for fresh charges until such residuum becomes richly charged with non-volatile ingredients of the refuse.

JOHN COPE BUTTERFIELD.

Witnesses:
O. J. WORTH,
TRACY LAY.